No. 121,435. Patented Nov. 28, 1871.

Tin-plate screw-necks & caps, for cans, & the machinery therefor: John H. Stone, assignor to himself & J. M. Williams.

Witnesses.
Benj. Morison
Wm. H. Morison

Inventor:
John H. Stone 121,435

UNITED STATES PATENT OFFICE.

JOHN H. STONE, OF HAMILTON, CANADA WEST, ASSIGNOR TO HIMSELF AND J. M. WILLIAMS, OF SAME PLACE.

IMPROVEMENT IN MACHINES FOR MAKING SHEET-METAL SCREW-NECKS AND SCREW-CAPS FOR CANS.

Specification forming part of Letters Patent No. 121,435, dated November 28, 1871.

*To all whom it may concern:*

Be it known that I, JOHN H. STONE, of Hamilton, in the Province of Ontario, Canada West, have invented certain Improvements in Machinery for Making Screw-Necks and Caps of Tin Plate for Sheet-Metal Cans, of which the following is a specification:

My invention consists in the construction and arrangement in suitable bearings of a rotary screwing-shaft, cutters, and bevel-edged washers, in combination with corresponding adjustable dies in supports, in such a manner that screw-necks and caps of tin plate can be alternately produced thereby in a more perfect and rapid manner than heretofore.

Figure 1:
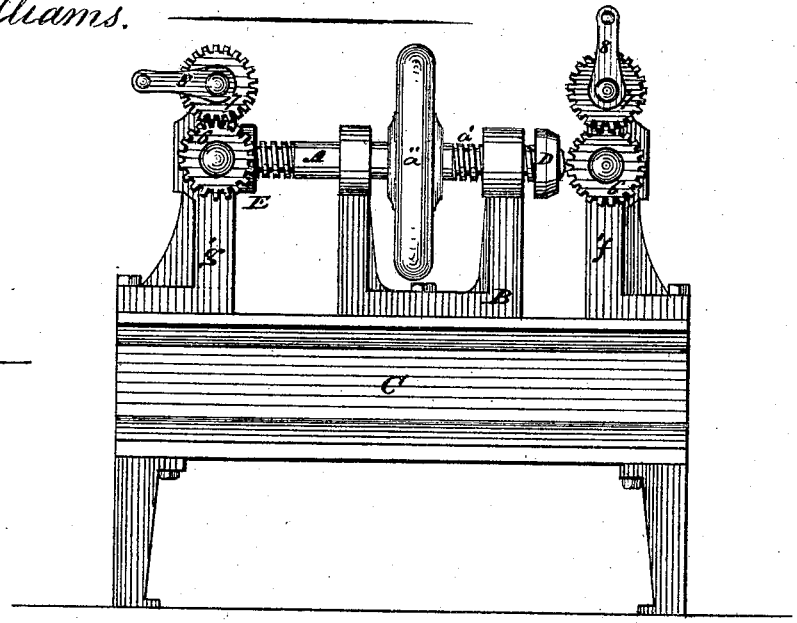
Figure 3:
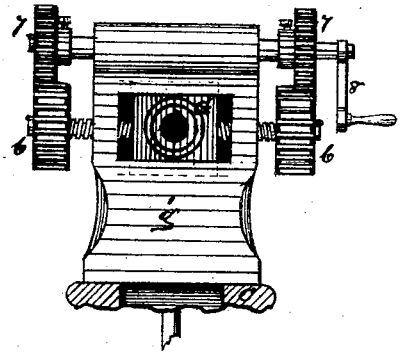
Figure 2:
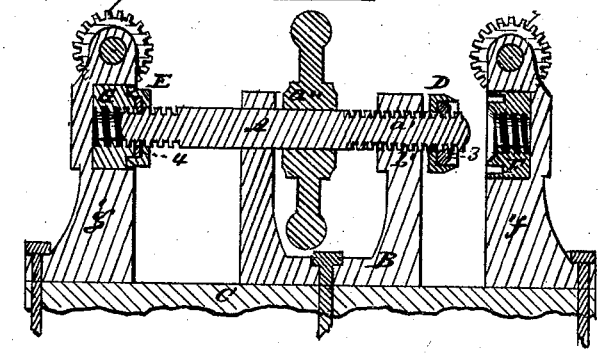
Figure 2:
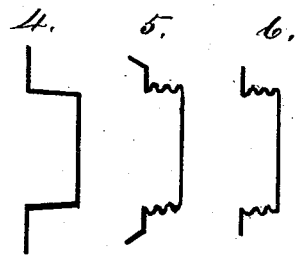

Figure 1 is a side elevation of the machinery embodying my invention therein, and Fig. 2 is a vertical longitudinal section of the same. Fig. 3 is a front view of the inner side of either of the two supports for the dies and their operating devices. Fig. 4 is a transverse section of the disks of tin plate as previously "stamped up" for placing in the dies for being screwed, and Figs. 5 and 6 the same plates of tin plate after being trimmed and screw-threaded—the one as the "neck," the other as the "cap."

The shaft A is made to rotate in a suitable support, B, which is fixed to the main frame C, and is caused to move therein longitudinally in either direction by means of corresponding screw-threads $a'$ $b'$, the shaft A being rotated accordingly by operating the hand-wheel $a''$, which is fast on the said shaft A. Each end of the shaft has a screw cut around it, which screws firmly through, and thus carries a circular cutter and a washer, each cutter being recessed sufficiently deep to receive within it the said washer. The cutter D has the edge of its washer 3 beveled, as shown in Fig. 2. The cutter E has its washer 4 without any bevel, as shown in the same figure. Directly opposite to the said cutters and washers, respectively, of the shaft A are secured dies F and G, which are counterparts of the respective screws on the ends of the shaft and of the cutters and washers. Each of the dies is divided vertically into two parts, (see Fig. 3,) and they are supported in bearings $f'$ $g'$, and opened and closed by means of right-and-left screw-shafts 5 5 attached thereto in the supports, and operated simultaneously by means of the broad-faced spur-wheels 6 6 and the pinions 7 7, the latter being on one and the same shaft and operated together by means of a hand-crank, 8. The cutter D, washer 3, screw-cut end of shaft A, and dies F, operating together, trim, bevel, and screw the previously stamped-up tin plates (Fig. 4) which are to serve as the necks (Fig. 5) of sheet-metal cans; and the cutter E, washer 4, the screw-cutting or impressing end of shaft A, and the dies G, trim and screw the tin plates (stamped up like Fig. 4) which are to serve as the caps, Fig. 6. The diameter of the screwed part of each cap is about twice the thickness of the tin plate used greater than that of the neck over which the cap screws, and consequently the threading-screws and dies are respectively made accordingly. The object of the cutters is to trim "true" the irregular edges of the stamped-up plates, Fig. 5.

The disks of tin plate having previously been stamped up by the usual well-known stamp and dies substantially in the form shown in Fig. 4, those for the necks of the cans are successively inserted into the closed die F, and the shaft A, with its cutter D and washer 3, forcibly brought up against the same, and the rotary motion of the shaft continued until the edge of the tin plate is trimmed by the cutter D, the flange beveled, as shown in Fig. 5, by the beveled edge of the washer 3, which at the same time clamps and holds the tin plate firmly, and the screw-threads 9 (see Fig. 5) impressed around in the tin plate by the operation of the screw on that end of the shaft A in the die F with the said tin plate between. The screw-shaft A, with its attached cutter and washer, is then withdrawn by reversing the rotary motion of the same, the die parted by operating the crank 8, and thus releasing the finished neck, Fig. 5. Just before the screw-shaft A is retracted from the die, however, the stamped-up tin plate for the cap is to be inserted in the closed die E, and consequently the withdrawing of the shaft A from the die F causes the entrance of its opposite end into the opposite die G, whereby, with its cutter and washer, the tin-plate cap, Fig. 6, is produced, and so on, alternately, the necks and caps are produced completed and discharged; the whole operation requiring but a half minute or less to produce both neck and cap ready for application to the can.

The machinery may be arranged, if desired, to be operated by steam-power. The two sets of cutters, washers, threading-screws, and dies are, in this instance, operated by one screw-shaft in forming the required threads, &c., for both necks and caps; but it is obvious that two distinct machines may be made—the one for the necks, Fig. 5, and the other for the caps, Fig. 6—if it be desirable to have such separated machines, in order to employ separate workmen in producing the two parts.

The impressing of sufficiently sharp, full, and perfect screw-threads around in the material of necks and caps of tin plate has, I believe, never before been successfully effected; and such material, besides being stronger, more durable, and more easily soldered to the cans, is much less costly than either the sheet-brass or sheet-zinc heretofore used; and, moreover, the tin plate being much thinner than sheet-zinc, which is generally used, produces a sharper or more effective screw-thread by impressing.

I claim as my invention, as an improvement in machines for swaging screw-threads in hollow sheet-metal cylinders—

1. The annular cutter E and flat washer 4 connected to the screw-threaded mandrel A jointly with the annular groove in the die G and the internally screw-threaded die G, as and for the purpose set forth.

2. The annular cutter D and beveled washer 3 connected to the screw-threaded mandrel A jointly with the annular groove in the screw-threaded die F, as and for the purpose set forth.

JOHN H. STONE.

Witnesses:
BENJ. MORISON,
WM. H. MORISON.

(136)